US005831969A

United States Patent [19]
Bales et al.

[11] Patent Number: 5,831,969
[45] Date of Patent: Nov. 3, 1998

[54] ISDN D CHANNEL RESTORATION WITHOUT LOSS OF SIGNALING OR PACKET DATA

[75] Inventors: Bruce M. Bales, Louisville; Forrest L. Coleman, Denver, both of Colo.

[73] Assignee: Lucent Technologies Inc., Murray Hill, N.J.

[21] Appl. No.: 672,887

[22] Filed: Jun. 28, 1996

[51] Int. Cl.[6] ....................................................... H04J 3/14
[52] U.S. Cl. .......................... 370/225; 370/524; 370/904
[58] Field of Search .................................... 370/216, 217, 370/218, 225, 228, 264, 524, 904; 395/182.01, 182.02

[56] References Cited

U.S. PATENT DOCUMENTS

| | | | |
|---|---|---|---|
| 4,884,263 | 11/1989 | Suzuki | 370/225 |
| 5,333,187 | 7/1994 | Hiraiwa et al. | 379/219 |
| 5,398,236 | 3/1995 | Hemmady et al. | 370/225 |
| 5,490,135 | 2/1996 | Hiraiwa et al. | 370/225 |

*Primary Examiner*—Wellington Chin
*Assistant Examiner*—Soon-Dong Hyun
*Attorney, Agent, or Firm*—John C. Moran

[57] ABSTRACT

A communication switching system has a plurality of switch nodes with each of the switch nodes responsive to a failure of the primary signaling channel that is providing the common signaling channel in a facility access service (FAS) group to immediately switch to the secondary signaling channel of the FAS group. This switching occurs quickly so that no calls are dropped within the FAS group. Any logical links being communicated on the primary signaling channel are transferred to the secondary signaling channel with no data packets being irreplaceable lost. A first physical object is established to control a physical protocol on the primary signaling channel, and a second physical object is established to control the physical protocol on the secondary signaling channel. Further, a single software object is established to always control the first layer of software protocol on the common signaling channel whether that is the primary signaling channel or secondary signaling channel. When failure of the primary signaling channel is detected, information for the common signaling channel is routed from the second physical object to the software object, thereby preserving the common signaling channel.

10 Claims, 7 Drawing Sheets

5,831,969

ISDN D CHANNEL RESTORATION WITHOUT LOSS OF SIGNALING OR PACKET DATA

TECHNICAL FIELD

This invention relates to telecommunication switching systems having a plurality of switching nodes, and, in particular, to the rapid backup of a signaling channel interconnecting two of the switch nodes.

BACKGROUND OF THE INVENTION

In prior art telecommunications switching systems comprising a plurality of stored program controlled switch nodes, it is well known that when two switch nodes are interconnected by a plurality of PRI links, to form these PRI links to a facility access service (FAS) group. Within a FAS group of PRI links, the D channels (which is used for signaling) in all but two of the PRI links are utilized as an additional B (bearer) channel. In the two remaining PRI links, one D channel is designated as the primary D channel, and the D channel of the second remaining PRI link is designated as the secondary D channel. In accordance with CCITT specifications, if the primary D channel is lost, then, the two switching nodes will utilize the secondary D channel for signaling. The problem with the utilization of the secondary D channel in accordance with the specifications is that the primary D channel must time out which takes approximately 25 to 30 seconds before the process is started to utilize the secondary D channel. Because of this delay, all calls that were in transit (e.g., being set up) or performing some feature operation must be terminated. In addition, any data call being performed on a logical link of the primary D channel must be terminated.

There are a number of reasons why the primary PRI link may be disabled. One reason is that the primary PRI link is a wired link that has been cut accidentally. A second reason is that in a highly distributed system such as illustrated in U.S. Pat. No. 5,390,242 it is necessary to add and remove PRI links interconnecting switch nodes. At present, if calls are not to be terminated, it is necessary to wait until there are no calls being communicated on any of the links making up the FAS group. This is often done by indicating that each of the links is out of service. In general, this requires field personnel to work during the early morning hours when there is little activity on the system.

It is clear that a problem exists in the art with the present mechanism of the secondary link backing up the primary link if the primary link should fail. As noted in the previous paragraphs, there are a variety of conditions under which such failures can happen on a routine basis, and it is not desirable to lose routinely all transient calls.

SUMMARY OF THE INVENTION

The foregoing problems are solved, and a technical advance is achieved by an apparatus and method in a communication switching system having a plurality of switch nodes with each of the switch nodes responsive to a failure of the primary signaling channel that is providing the common signaling channel in a facility access service (FAS) group to immediately switch to the secondary signaling channel of the FAS group. Advantageously, this switching occurs quickly so that no calls are dropped within the FAS group. Advantageously, any logical links being communicated on the primary signaling channel are transferred to the secondary signaling channel with no data packets being irreplaceable lost.

A first physical object is established to control a physical protocol on the primary signaling channel, and a second physical object is established to control the physical protocol on the secondary signaling channel. Further, a single software object is established to always control the first layer of software protocol on the common signaling channel whether that is the primary signaling channel or secondary signaling channel. When failure of the primary signaling channel is detected, information for the common signaling channel is routed from the second physical object to the software object, thereby preserving the common signaling channel. Advantageously, a first physical protocol identifier is assigned to the first physical object, a second physical protocol identifier is assigned to the second physical object, and a first layer of software protocol identifier is assigned to the software object. The procedure for routing from the second physical object to the software object involves identifying the second physical protocol identifier with the first layer of software protocol identifier. Also, within the ISDN protocol, the first and second physical protocol identifiers are termination endpoint identifiers, and the first layer of software protocol identifier is a connection endpoint suffix.

Other and further aspects of the present invention will become apparent during the course of the following description and by reference to the accompanying drawing.

DETAILED DESCRIPTION

Figure 1:
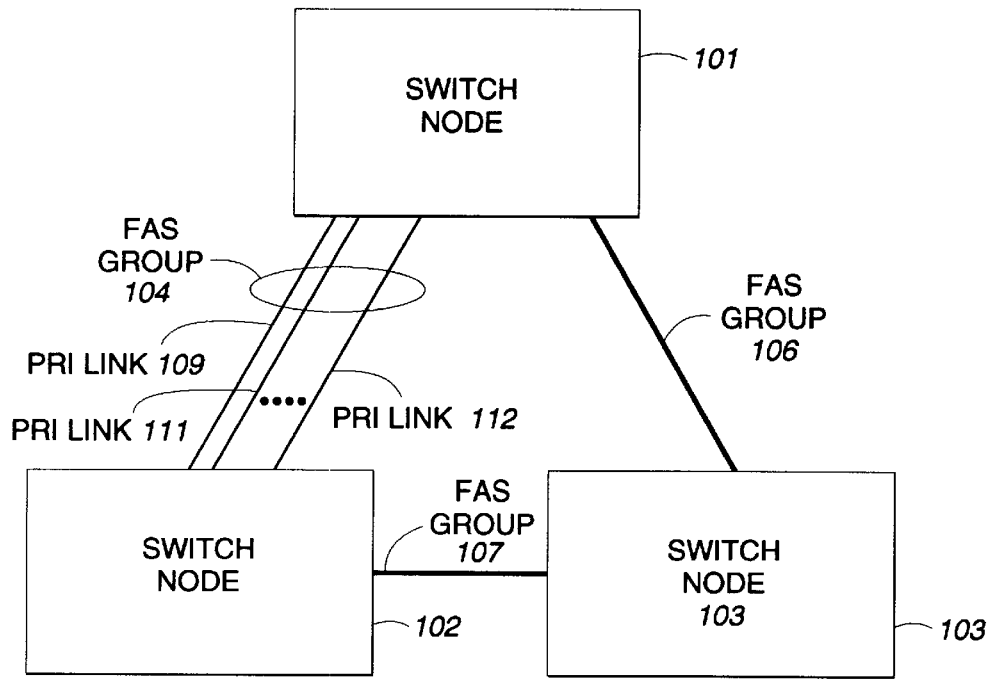
FIG. 1 illustrates, in block diagram form, a telecommunication switching system embodying the inventive concept.

FIG. 1 shows a telecommunication switching system having a plurality of switch nodes 101, 102, and 103. Advantageously, the switch nodes of FIG. 1 function as an integrated system to provide telecommunication services such as those provided by an individual or a network of AT&T Definity® Generic 2 Communications Systems. The switch nodes are shown as being interconnected by FAS groups of PRI links. Each FAS group comprises a plurality of PRI links such as PRI links 109 through 112 of FAS group 104. The switch nodes of FIG. 1 are arranged in a node hierarchy with switch node 101 being the highest switch node of the node hierarchy. The manner in which the node hierarchy initialization, and dialing plan initiationization are performed is described in detail in U.S. Pat. No. 5,386,466 which is hereby incorporated by reference.

Each PRI link in FAS group 104 comprises 24 channels. If a PRI link is utilized by itself, then the 24 channels of the PRI link are designated as follows: channel 0 is designated as the signaling channel/D channel and is utilized to handle the ISDN messages which are exchanged by the switch nodes. In addition, data calls can be set up on other logical links of the D channel. The remaining 23 channels are designated as B channels and can be utilized for voice or data information. Within a FAS group, one of the PRI links is designated to carry the primary D channel, such as PRI link 109, and a second PRI link is designated to carry the secondary D channel, such as PRI link 112. In both the primary and secondary PRI link, one of the 24 channels is designated as the D channel and the remaining 23 channels can be utilized for communicating voice or data information. The remaining PRI links, such as PRI link 111 of FAS group 104, utilize all 24 channels for the communication of voice and data information.

As will be described in greater depth later, the software programs are arranged in a software hierarchy with more general system operations being performed as one moves from the lowest level of the software hierarchy to the highest level. In accordance with the prior art which is the ISDN specification, if PRI link 109 fails, switch nodes 101 and 102 transfer the transmission of signaling messages from the D channel of PRI link 109 to the D channel of PRI link 112 after approximately 25 to 30 seconds has elapsed. This transfer is controlled in switch node 101 and 102 by one of the higher software layers. Unfortunately, once the transfer is accomplished, all transit calls being transported on FAS group 104 are abandoned and must be reset up. In accordance with the invention, the transfer from the D channel of PRI link 109 to the D channel of PRI link 112 is accomplished at the lowest software layer and allows for the preservation of all calls that are communicated on the D channel of PRI link 109.

Figure 2:
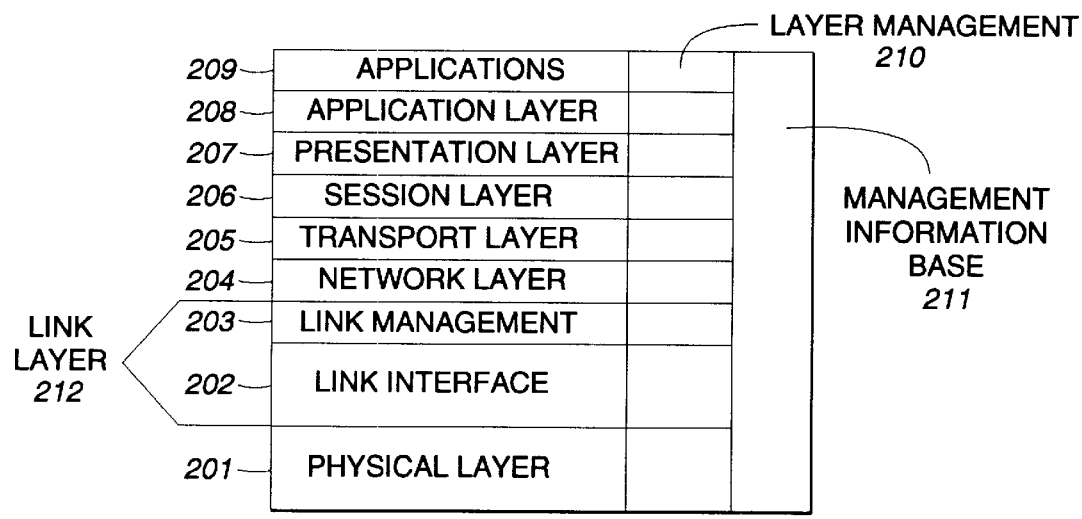
FIG. 2 illustrates a software architecture in accordance with the invention.

FIG. 2 illustrates the software architecture of the switch nodes of FIG. 1. This architecture is based on the conventional OSI model modified to implement the ISDN protocol. Further modifications have been made to this model to incorporate the invention. Software layers 205 through 209 are described in U.S. Pat. No. 5,386,466.

The principal function of physical layer 201 is to terminate physical links. Specifically, physical layer 201 is responsive for maintaining physical channels and for controlling physical sub-channels thereon. Physical layer 201 comprises a software portion and physical interfaces. Further, the software portion of physical layer 201 is responsible for the direct control of the physical interface to which physical links communicate PRI and BRI information terminate. Physical layer 201 presents to link layer 212 physical sub-channels and physical channel as entities controllable by link layer 212. Since physical layer 201 is terminating the physical links, physical layer 201 determines when a D channel of the primary PRI link of a FAS group has failed because of the lost of framing on the channels of the D channel.

The primary function of link layer 212 is to assure that the information transmitted over a physical channel is recovered intact and in the correct order. This is accomplished using another layer of protocol (referred to as the physical packet protocol) which allows multiple communications paths—commonly referred to as logical links—to be established on a given physical channel or a physical sub-channel communicating packetized data. These logical links are used to identify and process data being communicated between layer 212 and physical layer 201. In ISDN Q.921, the protocol used is the LAPD packet protocol. Further, link layer 212 allows higher software layers to control physical layer 201 in an abstract manner. Link layer 212 uses a first layer of software protocol.

As seen in FIG. 2, link layer 212 is divided into link interface 202 and link management 203. The reason for this division is set forth herein below. It will be helpful at this point to discuss the communication of ISDN signals over a D channel to help readers who have only a rudimentary knowledge of the communication of ISDN signals over a D channel. At link layer 212, a plurality of logical links is established on a D channel. Only one of these logical links communicates ISDN control signals, and this logical link is referred to as a logical D channel (LDC). The LDC is identified by a logical D channel number (LDCN).

Link interface 202 does the majority of the functions performed by link layer 212, including the establishment of logical links. Link management 203 identifies the various link interfaces for higher software layers. Further, link management 203 communicates information between the logical links and higher software layers. In addition, link management 403 is responsive to a signal from physical layer 201 indicating that the primary D channel has lost framing to switch to the D channel of the secondary PRI link of a FAS group.

Network layer 204 processes information communicated on the LDCs and terminates the ISDN Q.931 protocol. Hence, this layer is responsible for negotiating the utilization of system resources for the termination or origination of calls external to a switching node. The network layer controls the allocation of channels on an interface on which a call is being received or set up. In addition, network layer 204 determines the primary and secondary D channels of a FAS group. For example, if switch node 102 receives a call from switch node 101 via PRI link 111, network layer 204 of switch node 102 negotiates with its peer layer (the corresponding network layer 204 in switch node 101) in order to obtain allocation of a D channel in PRI link 111. This negotiation is carried out using standard ISDN Q.931 messages such as the call setup message via the LDC setup on the D channel of PRI link 109 (assuming that this is the primary PRI link of FAS group 104). Greater detail on the manner in which network software layer 204 functions with respect to setting up calls is set forth in U.S. Pat. No. 5,386,466.

Figure 3:
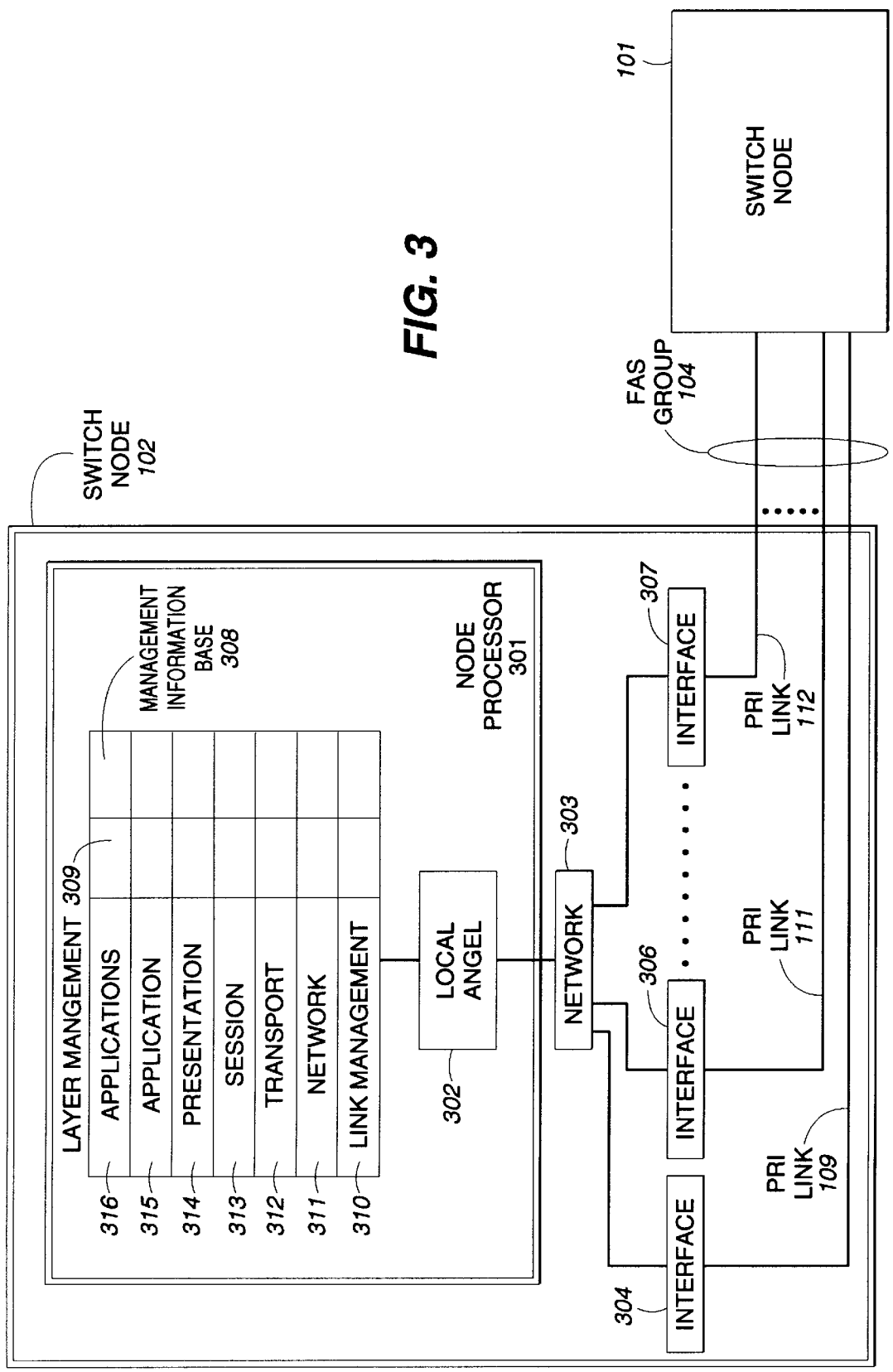
FIG. 3 illustrates, in block diagram form, greater detail of a switch node of the telecommunication switching system of FIG. 1.

FIG. 3 illustrates, in block diagram form, the software architecture of FIG. 2 as implemented in switch node 102. Software layers 203 through 209 are implemented on the main processor of switch node 102 which is node processor 301. Specifically, the software layers down through the link management portion of the link layer are realized by software layers denoted as 316 through 310 in node processor 301. The link interface portion of the link layer is implemented by a software module node in processor 301 designated as local angel 302.

The physical layer is jointly implemented by hardware and software. Specifically, the hardware portion of the physical layer for switch node 102 is implemented by interfaces 304 through 307. The software portion of the physical layer is performed by local angel 302.

To understand the operation of FIG. 3 consider the following example. First, consider the manner in which FAS group 104 is established. It is assumed that PRI link 109 is the first PRI link between switch node 101 and switch node 102 to be initialized with PRI link 112 being the second. When PRI link 109 is initialized, interface 304 and its corresponding interface in switch node 101 perform the necessary initial operations. One of these operations is the establishment of termination endpoint identifier (TEI) 412. Both the hardware and software operations upon a PRI link being initialized are set forth in detail in U.S. Pat. No. 5,386,466. During these operations, node numbers are exchanged between switch nodes 101 and 102, and switch node 102 determines that switch node 101 is higher in the hierarchy. After initialization, the link interface layer being executed in local angel 302 will have terminated and denoted two logical links in D channel 421. The higher level designation for the logical links is a connection endpoint suffix (CES) which is shown on FIG. 4 as CES 400. CES 400 and TEI 412 are logically connected to allow the communication of information. Link management 310 of FIG. 3 is responsive to the creation of CES 400 to create two logical links that terminate on virtual link object 431. Connection endpoint identifier 404 (also referred to as service access point identifier (SAPI) 0) is made operational on logical link 0 of D channel 421, and link management 310 establishes LAPD protocol 422 on this link and utilizing buffers 401. This logical link with corresponding protocol buffers is identified to network software layer 311 as LDCN 406. In addition, link management layer 310 establishes a communication link with its counterpart in switch node 101 on logical link 63 which is identified as CEI 403 (also referred to as SAPI 63) with the companion software entity LAPD 423 and buffers 402. As described in the aforementioned U.S. Patent, network software layer 311 associate call records with LDCN 406 for any calls that are set up on PRI link 109. Finally, link management software layer 310 marks PRI link 109 as communicating the primary D channel for any FAS group that may be started.

Next, assume that PRI link 112 is initialized between switch node 101 and switch node 102. When this PRI link is initialized, the link interface software being executed in local angel 302 establishes logical links on D channel 420, establishes TEI 417, and identifies the TEI 417 to CES 410. In response to the creation of CES 410, link management software layer 310 establishes virtual link object 432 which comprises elements 408–411, 424 and 426. Link management 310 also marks in management information base 308 that PRI link 112 is the secondary PRI link. At this point, link management software layer 310 identifies PRI link 109 and PRI link 112 as comprising FAS group 104. Note, that link management software layer 310 does not identify CEI 411 as a SAPI 0 link to network software layer 311. Hence, network software layer 311 does not create an LDCN for this new SAPI 0 link. Even though logical links 0 and 63 are set up on D channel 420, no messages are transmitted over these logical links while the primary PRI link 109 is properly functioning. Consequently, buffers 407 and 408 are empty. When PRI link 111 and subsequent PRI links of FAS group 104 become active, no logical links are established on what would be the D channel of these new PRI links, but rather, that channel is used as another B channel. All calls that are set up on FAS group 104 are controlled by LDCN 406 as illustrated in FIG. 4.

Figure 5:
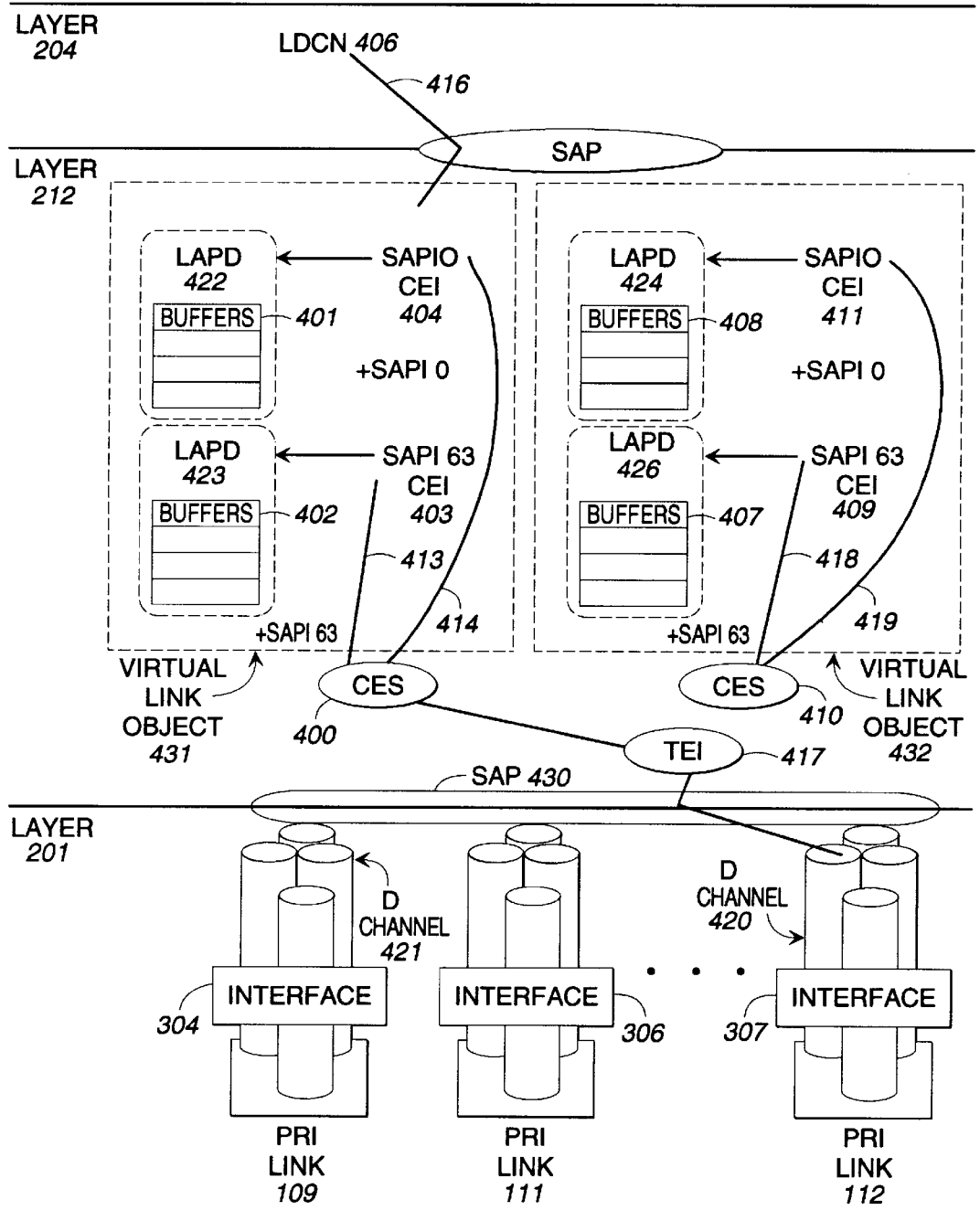

In accordance with the invention, consider now the operations performed by link management 310 upon PRI link 109 becoming disabled. Interface 304 detects the loss of framing on D channel 421 as soon as PRI link 109 becomes disabled. Interface 304 reports this loss to link management software layer 310 via the link interface software. Link management 310 then directs the link interface software to communicate information between TEI 417 (which terminates D channel 420) and CES 400 rather than CES 410. The information in buffers 401 and 402 is still valid and has not been lost. Any packets which were in transit via PRI link 109 during the period of time that it became disabled will be recovered by the LAPD protocols 422 and 423 in conjunction with the LAPD protocols in switch node 101. Switch node 101 performs the same operations as performed by switch node 102. The result is illustrated in FIG. 5. Importantly, network software layer 311 never becomes aware of the change from D channel 421 to D channel 420; hence, network software layer 311 does not drop any calls. Note, that the higher software layers 312 through 316 are also totally unaware of the interchange of D channels.

Figure 4:
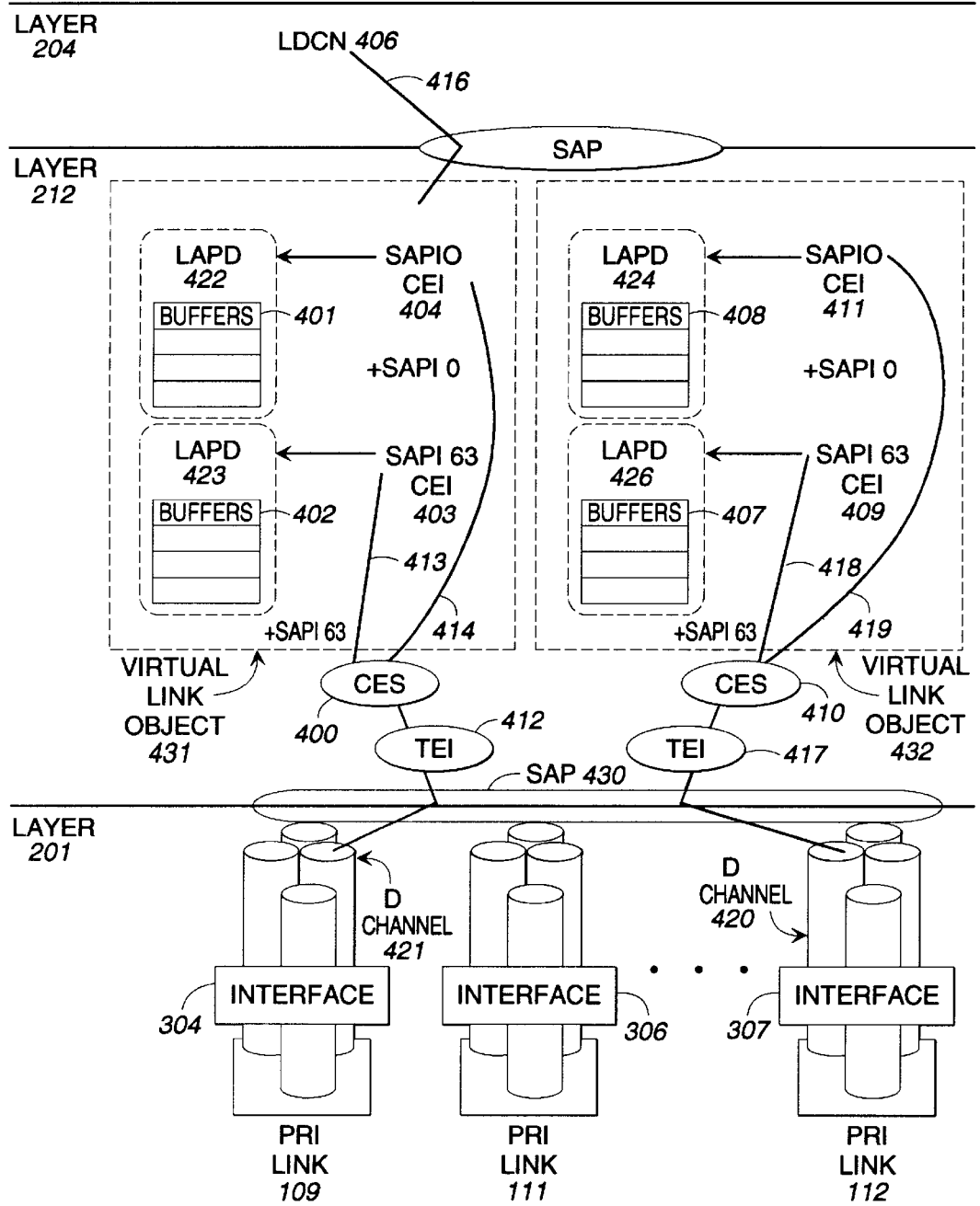
FIGS. 4 and 5 illustrate the internal data and control structures for the physical and link layers.
Figure 6:
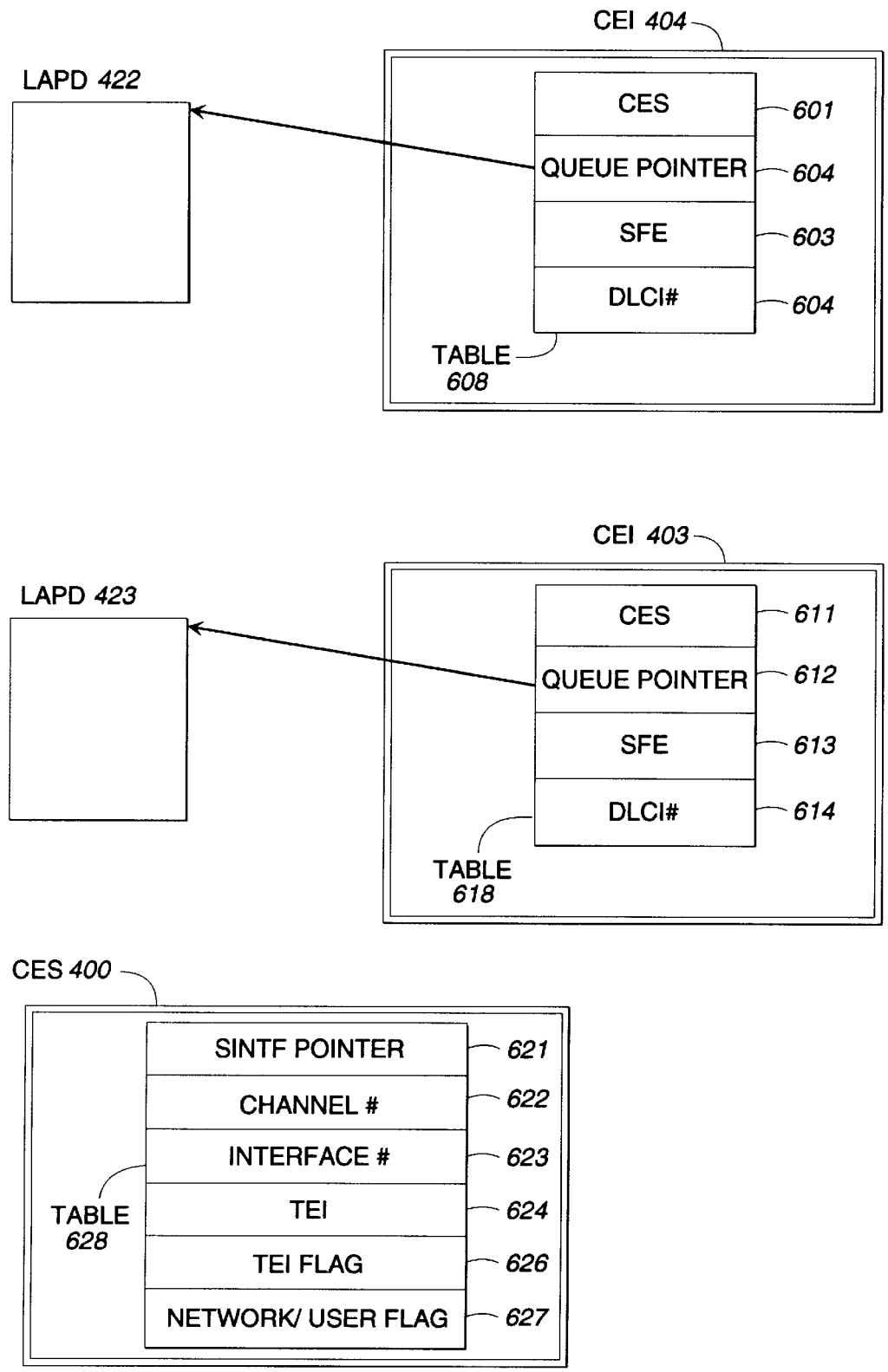
FIG. 6 illustrates tables used by a virtual link object.

FIG. 6 illustrates the tables that comprise CEI 403, CEI 404, and CES 400 as shown on FIG. 4. Within CEI 403 and CEI 404, the CES 611 and CES 601 entries in tables 608 and 618 respectively, define whether CES 400 or CES 410 of FIG. 4 is being utilized. Within CES 400, channel number 622, interface number 623 and TEI 624 entries in table 628 define whether TEI 412 or TEI 417 of FIG. 4 is being utilized for communication of information. As previously described, when recovery is made from failed primary PRI link 109 to the secondary PRI link 112, CES entries 601 and 611 are changed to reflect that TEI 417 is being utilized rather than TEI 412. The channel number entry defines the channel being utilized which in the case of a PRI link is channel 0. The interface number defines the physical interface, i.e., interface 304. In tables 608, 618, and 628 the remainder of the entries are defined in U.S. Pat. No. 4,386,466 which is hereby incorporated by reference.

Figure 7:
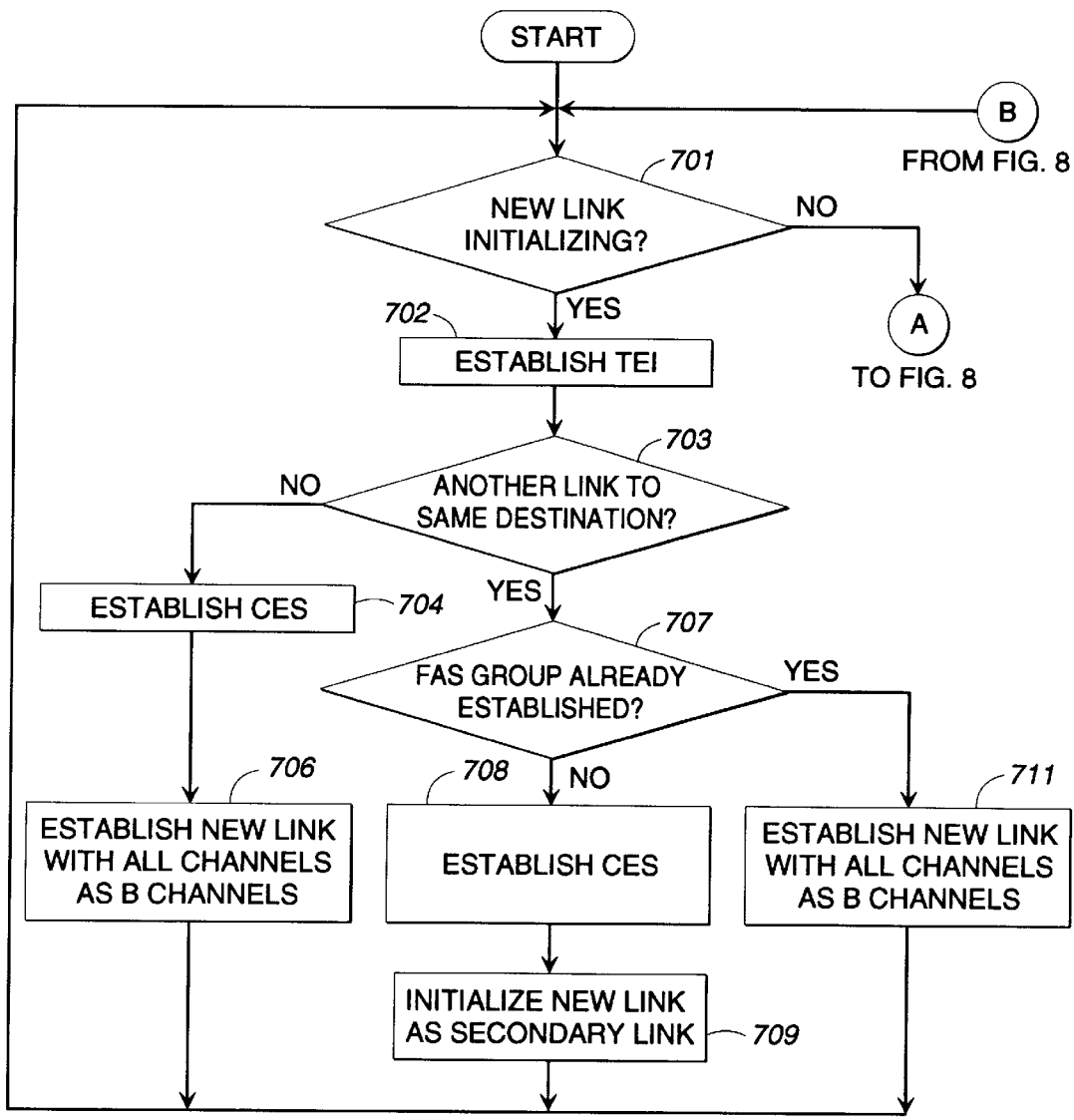
FIG. 7 illustrates, in flow chart form, the operations performed by the link layer in setting up a FAS group.

FIG. 7 illustrates the operations of the link layer in setting up a FAS group and in processing the initialization of a new PRI link. Decision block 701 determines if a new link is initializing. If the answer is yes, block 702 establishes a TEI for this new PRI link. Decision block 703 then determines if there is already a PRI link going to the same destination switch node. If the answer is no, block 704 establishes the CES, and block 706 initializes the new link as a sole PRI link before transferring control back to decision block 701.

Returning to decision block 703, if the answer is yes, decision block 707 determines if a FAS group has already been established. If the answer is yes in decision block 707, block 711 establishes the new PRI link using all of the channels as D channels before returning control back to 701. If the answer in decision block 707 is no, block 708 establishes the CES, and block 709 initializes the new link as a secondary link.

Figure 8:
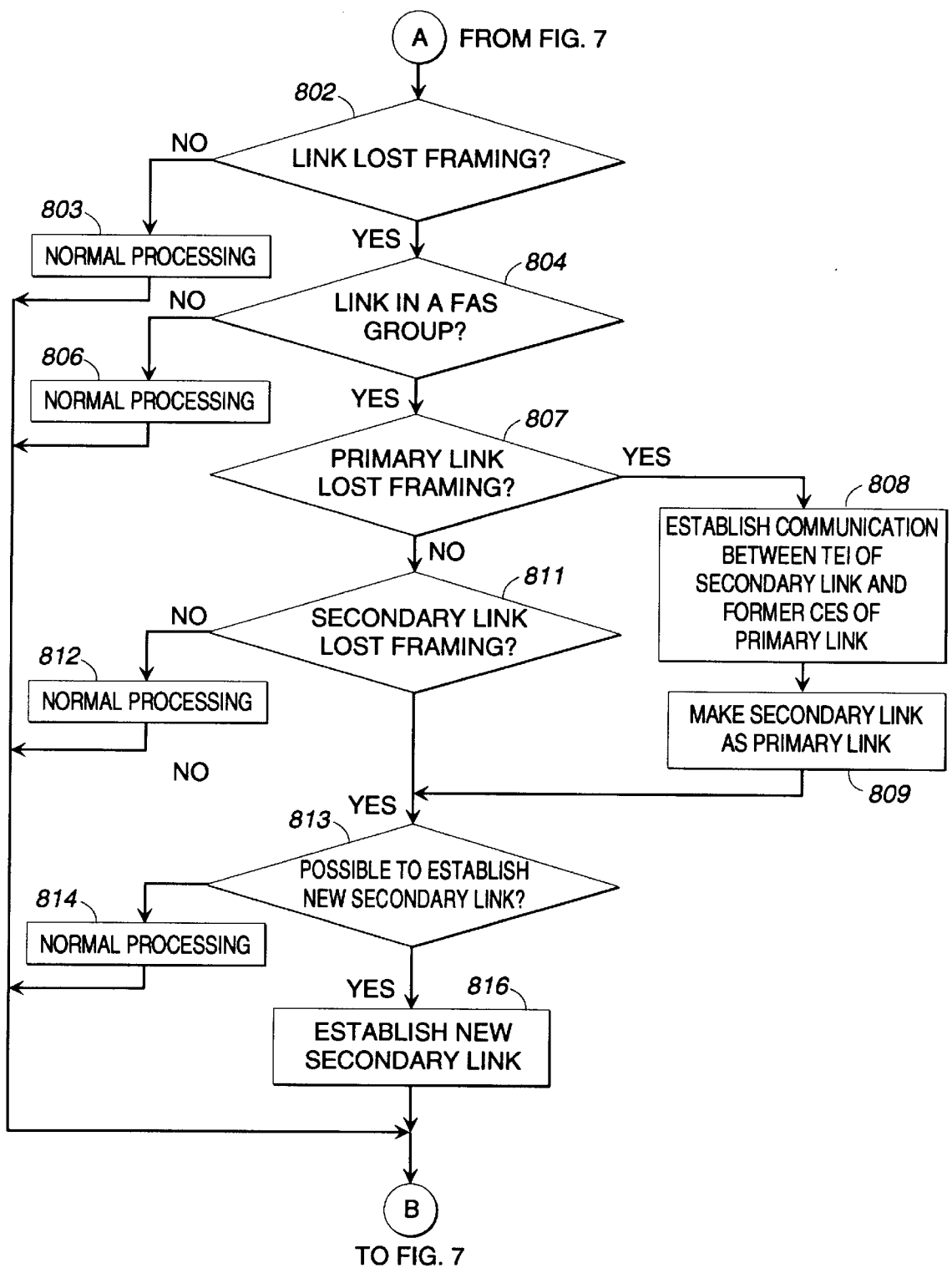
FIG. 8 illustrates, in flow chart form, the operations performed by the link layer in transferring the communication in information from the primary link to the secondary link in accordance with the invention.

Returning to decision block 701, if the answer is no, control is transferred to decision block 802 of FIG. 8. FIG. 8 illustrates the operations performed by the link layer when a PRI link loses framing. If the answer in decision block 802 is no, block 803 processes the stimulus received by the link layer in the normal manner. If the answer in decision block 802 is yes, decision block 804 determines if the link is in a FAS group. If the answer is no in decision block 804, block 806 performs normal processing for a link that has lost framing. If the answer in decision block 804 is yes, decision block 807 determines if the primary link of the FAS group has lost framing. If the answer is yes in decision block 807, block 808 establishes communication between the TEI of the secondary link and the CES of the former primary link. This result is illustrated in FIG. 5. Block 809 then marks the secondary link as the primary link in the management information base 308 of FIG. 3 before transferring control to decision block 813.

If the answer in decision block 811 was yes indicating that the secondary link had lost framing, control is transferred to decision block 813. Decision block 813 determines whether it is possible to establish a new secondary link one of the other links presently in the FAS group. A new secondary link can only be established if channel 0 of one of the other links is idle so that this channel 0 can be designated as a D channel rather than a B channel. If the answer is no in decision block 813, block 814 performs normal processing. If the answer in decision block 813 is yes, block 816 establishes a new secondary link for the FAS group before transferring control back to decision block 701 of FIG. 7.

It is to be understood that the above-described embodiment is merely illustratively of the principles of the invention and that other arrangements may be devised by those skilled in the art without departing from the spirit and scope of the invention. In particular, other software structures could be utilized to represent the CEI and CES tables. Further, it would be apparent to one skilled in the art that the invention could be applied to switching systems other than telecommunication switching systems.

The invention claimed is:

1. A method of restoring signaling for a plurality of telecommunication links that share a common signaling channel, comprising the steps of:

identifying a first signaling channel in a first one of the plurality of telecommunication links to provide the common signaling channel;

identifying a second signaling channel in a second one of the plurality of telecommunication links to provide the common signaling channel upon the first signaling channel failing;

setting up a first physical object to control a physical protocol on the first signaling channel and a second physical object to control the physical protocol on the second signaling channel;

setting up a software object to control communication via the common signaling channel using a first layer of software protocol;

routing information for the common signaling channel from the first physical object to the software object;

detecting a failure of the first signaling channel; and routing information for the common signaling channel from the second physical object to the software object in response to a detection of the failure whereby the common signaling channel is preserved.

2. The method of claim 1 wherein the step of setting up the first physical object comprises the step of assigning a first physical protocol identifier to the first one of the plurality of telecommunication links;

the step of setting up the software object comprises the step of assigning a first layer of software protocol identifier to the common signaling channel;

the step of setting up the second physical object comprises the step of assigning a second physical protocol identifier to the second one of the plurality of telecommunication links; and the step of routing information for the common signaling channel from the second physical object to the software object comprises the step of identifying the second physical protocol identifier with the first layer of software protocol identifier.

3. The method of claim 2 wherein the first and second physical protocol identifiers are termination endpoint identifiers and the first layer of software protocol identifier is a connection endpoint suffix.

4. The method of claim 3 wherein the step of routing in response to the detection of the failure is performed by a software layer executing the first layer of software protocol.

5. The method of claim 4 wherein the first and second telecommunication links are ISDN links and the first and second signaling channels are transported on individual D channels of the first and second telecommunication links.

6. An apparatus for restoring signaling for a plurality of telecommunication links that share a common signaling channel, comprising:

means for identifying a first signaling channel in a first one of the plurality of telecommunication links to provide the common signaling channel;

means for identifying a second signaling channel in a second one of the plurality of telecommunication links to provide the common signaling channel upon the first signaling channel failing;

means for setting up a first physical object to control a physical protocol on the first signaling channel and a second physical object to control the physical protocol on the second signaling channel;

means for setting up a software object to control communication via the common signaling channel using a first layer of software protocol;

means for routing information for the common signaling channel from the first physical object to the software object;

means for detecting a failure of the first signaling channel; and means for routing information for the common signaling channel from the second physical object to the software object in response to a detection of the failure whereby the common signaling channel is preserved.

7. The apparatus of claim 6 wherein the means for setting up the first physical object comprises means for assigning a first physical protocol identifier to the first one of the plurality of telecommunication links;

the means for setting up the software object comprises means for assigning a first layer of software protocol identifier to the common signaling channel;

the means for setting up the second physical object comprises means for assigning a second physical protocol identifier to the second one of the plurality of telecommunication links; and the means for routing information for the common signaling channel from the second physical object to the software object comprises means for identifying the second physical protocol identifier with the first layer of software protocol identifier.

8. The apparatus of claim 7 wherein the first and second physical protocol identifiers are termination endpoint identifiers and the first layer of software protocol identifier is a connection endpoint suffix.

9. The apparatus of claim 8 wherein the means for routing in response to the detection of the failure is performed by a software layer executing the first layer of software protocol.

10. The apparatus of claim 9 wherein the first and second telecommunication links are ISDN links and the first and second signaling channels are transported on individual D channels of the first and second telecommunication links.

* * * * *